United States Patent Office 2,879,280
Patented Mar. 24, 1959

2,879,280

15-HYDROXY PROGESTERONES

Josef Fried, New Brunswick, Richard W. Thoma, Somerville, David Perlman, Princeton, and John R. Gerke, Franklin Township, N. J., assignors to Olin Mathieson Chemical Corporation, New York, N.Y., a corporation of Virginia No Drawing. Application May 27, 1955
Serial No. 511,781

15 Claims. (Cl. 260—397.4)

This application is a continuation-in-part of our copending application, Serial Number 372,798, filed August 6, 1953, now Patent No. 2,753,290, issued July 3, 1956.

This invention relates to the synthesis of valuable steroids.

One object of this invention is the provision of steroids of the progesterone series having a 15-hydroxy or 15-acyloxy group, which compounds are useful either for their own physiological action or as intermediates in the preparation of physiologically-active derivatives.

The compounds of this invention comprise: (a) 15α-hydroxyprogesterone; (b) 15β-hydroxyprogesterone; (c) carboxylic acid esters of 15α-hydroxyprogesterone; and (d) carboxylic acid esters of 15β-hydroxyprogesterone. The preparation of the 15α-hydroxy and 15β-hydroxyprogesterones of this invention by the microbiological oxidation of progesterone is disclosed in said Patent No. 2,753,290. The carboxylic acid esters of 15α-(and 15β)-hydroxyprogesterone of this invention are preferably prepared from the free hydroxy derivatives by reacting the latter with an acylating agent such as a carbonyl halide or carboxylic acid anhydride, as more fully disclosed hereinafter.

Among the compounds of this invention are those of the general formula

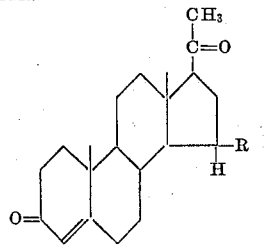

wherein R is in either the alpha or beta position and represents hydroxy or an organic carbonyloxy radical. Suitable organic carbonyloxy radicals include the aliphatic carbonyloxy radicals, such as the alkanoyloxy radicals (e.g. lower alkanoyloxy radicals such as acetoxy, propionyloxy, butyryloxy, valeryloxy, caproyloxy, and enanthoyloxy), aroyloxy radicals (e.g. aromatic hydrocarbon carbonyloxy radicals, such as benzoyloxy and naphthoyloxy), cycloalkanoyloxy radicals (e.g. hexahydrobenzoyloxy), aralkanoyloxy radicals (e.g. α-toloyloxy and β-phenylpropionyloxy), and heterocyclic carbonyloxy radicals (e.g. nicotinoyloxy, furoyloxy, and 2-thiophenecarbonyloxy). The preferred organic carbonyloxy radicals, however, are those of hydrocarbon carboxylic acids having less than ten carbon atoms, the lower alkanoic acid esters being particularly preferred.

To prepare the steroids of this invention, progesterone is subjected to the action of the enzymes of a microorganism selected from the class consisting of *Penicillium sp.* A.T.C.C. 11,598, *Streptomyces aureus* WC 3569 (Institute of Microbiology, Rutgers University), *Streptomyces sp.* WC 3676 (Institute of Microbiology, Rutgers University), *Colletotrichum antirrhini* (Department of Plant Pathology, Cornell University, and *Phycomyces blakesleeanus* (Department of Biological Sciences, Purdue University) in an aqueous medium containing a source of nitrogeneous factors and an assimmilable source of carbon and energy, in the presence of oxygen, and recovering the 15-hydroxyprogesterones formed. This method is more fully detailed in said Patent No. 2,753,-290 and in the examples following.

The 15-hydroxyprogesterone, thus formed, can then be acylated by reacting the 15-hydroxy steroid with an acylating agent such as a carbonyl halide or a carboxylic acid anhydride in the presence of a basic agent. Suitable carbonyl halides include the aliphatic carbonyl halides, such as the alkanoyl chlorides (e.g. a lower alkanoyl chloride, such as acetyl chloride, propionyl chloride, butyryl chloride, valeryl chloride, caproyl chloride, and enanthoyl chloride), aroyl chlorides (e.g., benzoyl chloride and naphthoyl chloride), cycloalkanoyl chlorides (e.g., hexahydrobenzoyl chloride), aralkanoyl chlorides (e.g., α-toluyl chloride and β-phenylpropionyl chloride), and heterocyclic carbonyl chlorides (e.g., nicotinoyl chloride, furoyl chloride, and 2-thiophenecarbonyl chloride). The preferred carbonyl halides are the hydrocarbon carbonyl chlorides having less than ten carbon atoms, the lower alkanoyl chlorides being particularly preferred. Suitable carboxylic acid anhydrides include the aliphatic carboxylic acid anhydrides, such as the alkanoic anhydrides (e.g. lower alkanoic anhydrides, such as acetic anhydride, propionic anhydride, butyric anhydride, valeric anhydride, caproic anhydride, and enanthic anhydride), aromatic carboxylic acid anhydrides (e.g. benzoic anhydride and naphthoic anhydride), cycloalkanoic anhydrides (e. g., hexahydrobenzoic anhydride), aralkanoic anhydrides (e.g., α-toluic anhydride and β-phenylacetic anhydride), and heterocyclic carboxylic acid anhydrides (e.g. nicotinic anhydride, 2-furoic anhydride, and 2-thiophenecarboxylic anhydride). The preferred carboxylic acid anhydrides are the hydrocarbon carboxylic acid anhydrides having less than nineteen carbon atoms, the lower alkanoic anhydrides being particularly preferred. Suitable basic agents are organic bases (e.g. pyridine and collidine) and inorganic bases (e. g. the alkali salts of lower fatty acids). The acylating reaction is conducted either with an organic base serving as a solvent, or in an inert organic solvent such as chloroform, using at least a stoichiometric amount of acylating agent.

The carboxylic acid esters of both the 15α-hydroxyprogesterone and 15β-hydroxyprogesterone of this invention are active materials which possess progestational activity. Thus, the new steroids of this invention can be administered instead of, and in the same manner as, progesterone in the treatment of functional uterine bleeding and amenorrhea. The dosage for such administration is of course dependent on the relative activity of the particular ester and progesterone. The 15α-hydroxyprogesterone and 15β-hydroxyprogesterone are also utilizable intermediates in the preparation of 14-dehydroprogesterone, as disclosed in application Serial No. 511,783 of Josef Fried, filed on even date herewith; also in the preparation of 15-ketoprogesterone, as disclosed in our Patent No. 2,753,290.

The following examples are illustrative of the invention (all temperatures being in centigrade):

EXAMPLE 1

*15α-hydroxyprogesterone*

(a) FERMENTATION

A medium of the following composition is prepared:

| | G. |
|---|---|
| Cornsteep liquor solids | 3 |
| NH₄H₂PO₄ | 3 |

| | |
|---|---|
| $CaCO_3$ | 2.5 |
| Soybean oil | 2.2 |
| Progesterone | 0.50 |
| Distilled water to make one liter. | |

The pH of the medium is adjusted to 7.0±0.1 (with sodium hydroxide solution); and 100 ml. portions of the medium are distributed in 500 ml. Erlenmeyer flasks, and the flasks plugged with cotton and sterilized by autoclaving for 30 minutes at 120°. When cool, each of the flasks is inoculated with 5–10% of a vegetative inoculum of *Penicillium sp.* A.T.C.C. 11,598. The flasks are mechanically shaken for 72 hours in a room maintained at 25°; and the contents of the flasks are pooled, adjusted to pH 4.0±0.2 with sulfuric acid, and filtered by suction through Seitz filter pads. [The vegetative inoculum used is grown from stock cultures (lyophilized vial or agar slant) for 24–72 hours (with or without successive 24–72 hour periods) in a medium of the following composition: 15 g. cornsteep liquor solids; 10 g. brown sugar; 6 g. $NaNO_3$; 0.001 g. $ZnSO_4$; 1.5 g. anhydrous $KH_2PO_4$; 0.5 g. $MgSO_4.7H_2O$; 5 g. $CaCO_3$; 2 g. lard oil; and distilled water to make one liter, the medium being sterilized by autoclaving for 30 minutes at 120°.]

(b) ISOLATION OF THE 15α-HYDROXYPROGESTERONE FORMED 1890 ml. of a culture filtrate obtained as described in section *a* by fermentation of 1.0 g. of progesterone is extracted with four 900 ml. portions of chloroform. The chloroform solutions are combined and evaporated to dryness in vacuo. The residue, weighing about 358 mg., crystallizes readily from acetone, and yields a total of about 100 mg. of crystalline material melting at 225–30°. This material may be purified by chromatography on a sulfuric acid-washed alumina column. For this purpose, 38 mg. of the crystalline material is dissolved in 1 ml. chloroform and 3 ml. benzene, and chromatographed on 1 g. alumina. Elution of the column with 200 ml. of a mixture of 1 part of chloroform and three parts of benzene, followed by 80 ml. of a mixture of equal volumes of chloroform-benzene, yields about 32 mg. of a 15α-hydroxyprogesterone, which after one recrystallization melts at about 231–232°; $[\alpha]_D^{22} +219°$ (c, 0.94 in $CHCl_3$);

$\lambda_{max}^{alc.}$ 240 m$\mu$($\epsilon$=16,500); $\lambda_{max}^{Nujol}$ 2.93$\mu$(OH)

5.92$\mu$ (sat. CO); 6.02$\mu$ (conj. CO); 6.19$\mu$ (conj. double bond).

*Analysis.*—Calcd. for $C_{21}H_{30}O_3$: C, 76.33; H, 9.15. Found: C, 76.14; H, 9.00.

Continued elution of the column with 175 ml. chloroform yields about 9 mg. of material (probably an X,15α-dihydroxyprogesterone), which after one crystallization melts at about 251–253°; $[\alpha]_D^{22} +202°$.

*Analysis.*—Calcd. for $C_{21}H_{30}O_4$: C, 72.80; H, 8.73. Found: C, 73.30; H, 9.54.

EXAMPLE 2

15α-hydroxyprogesterone (a) FERMENTATION

A fermentation medium of the following composition is prepared:

| | G. |
|---|---|
| Soybean oil | 2.2 |
| Progesterone | 0.25 |
| Soybean meal | 15 |
| Glucose | 10 |
| $CaCO_3$ | 2.5 |
| Water to make one liter. | |

100 ml. portions of the medium are distributed in 500 ml. Erlenmeyer flasks, and the flasks are plugged with cotton and sterilized by autoclaving. When cool, each of the flasks is inoculated with 5–10% of a vegetative inoculum of *Streptomyces aureus* WC 3569 which has been grown for 48–72 hours in a soybean meal-glucose medium. The flasks are mechanically shaken for 72 hours in a room maintained at 25°, and the contents of the flasks are pooled, adjusted to pH 4.0±0.2° with sulfuric acid, and filtered by suction through Seitz filter pads.

(b) ISOLATION OF THE 15α-HYDROXYPROGESTERONE FORMED 2,500 ml. of a culture filtrate obtained as described in section *a* by fermentation of 750 mg. progesterone is treated as described in section *b* of Example 1, yielding about 80 mg. crude steroids, from which the 15α-hydroxyprogesterone is readily isolated in crystalline form. The product is identical with the 15α-hydroxyprogesterone described in section *b* of Example 1, both in composition and sterioisomeric form.

EXAMPLE 3

(a) FERMENTATION

The same fermentation conditions as described in section *a* of Example 2 are employed, except that *Streptomyces sp.* WC 3676 is employed in place of the *Streptomyces aureus.*

(b) ISOLATION OF THE 15α-HYDROXYPROGESTERONE FORMED 2500 ml. of a culture filtrate obtained as described in *a* by fermentation of 750 mg. progesterone is treated as described in section *b* of Example 1, yielding about 141 mg. of crude product, from which the 15α-hydroxyprogesterone crystallizes on rubbing with acetone. The product is identical with the 15α-hydroxyprogesterone described in section *b* of Example 1, as indicated by its melting point, rotation, infrared spectrum, and mixed melting point.

EXAMPLE 4

15α-hydroxyprogesterone (a) FERMENTATION

The same fermentation conditions as described in section *a* of Example 1 are employed, except that *Colletotrichum antirrhini* is employed in place of the *Pencillium sp.* A.T.C.C. 11,598.

(b) ISOLATION OF THE 15α-HYDROXYPROGESTERONE FORMED 1000 ml. of a culture filtrate obtained as described in *a* by fermentation of 300 mg. progesterone is treated as described in section *b* of Example 1, yielding about 129 mg. crude product, from which 15α-hydroxyprogesterone may be crystallized.

EXAMPLE 5

15β-hydroxyprogesterone (a) FERMENTATION

The same fermentation conditions as described in section *a* of Example 1 are employed, except that *Phycomyces blakesleeanus* is employed in place of *Pencillium sp.* A.T.C.C. 11,598.

(b) ISOLATION OF THE 15β-HYDROXYPROGESTERONE 9 liters of a culture filtrate obtained as described in *a* by fermentation of 4.85 g. progesterone is extracted with six 2 liter portions of chloroform. The combined chloroform extract is filtered, and evaporated to dryness in vacuo. The residue, weighing about 1.31 g., is taken up in 25 ml. 80% aqueous methanol, and the resulting solution extracted with five 25 ml. portions of hexane. The methanol solution is then evaporated to dryness, and the residue (weighing about 1.023 g.) is dissolved with warming in 1 ml. of chloroform and 4 ml. of benzene. The resulting solution is chromatographed on 20 g. of sulfuric acid-washed alumina. Elution with 400 ml. of a mixture of 1 part of chloroform and 4 parts of benzene yields about 470 mg. of a 15β-hydroxyprogesterone, which after recrystallization from acetone melts at about 204-205° C, $[\alpha]_D^{22}+151°$ (C, 0.98 in $CHCl_3$);

$\lambda_{max}^{alc.}$ 241 mμ(ε=15,800); $\lambda_{max}^{Nujol}$ 2.96μ(OH) 5:90μ (sat. CO); 6.06μ (conj. CO); 6.19μ (conj. double bond).

*Analysis.*—Calcd. for $C_{21}H_{30}O_3$: C, 76.33; H, 9.15. Found: C, 76.31; H, 8.90.

EXAMPLE 6

15α-hydroxyprogesterone acetate

A solution of 40.3 mg. of 15α-hydroxyprogesterone (M. P. about 230-232°) in 1 ml. of dry pyridine and ½ ml. acetic anhydride is allowed to stand at room temperature for 20 hours. After removal of the reagents in high vacuum the residue is crystallized from acetone-hexane. The pure acetate of 15α-hydroxyprogesterone has the following properties, m.p. about 175-177°; $[\alpha]_D^{23}+154°$ (C, 1.00 in chlf.);

$\lambda_{max}^{alc.}$ 239 mμ(ε=17,700); $\lambda_{max}^{Nujol}$ 5.77μ(acetyl) 5.89μ (20-keto), 6.02μ, 6.20μ ($\Delta^4$-3-ketone).

*Analysis.*—Calcd. for $C_{23}H_{32}O_4$ (372.49): C, 74.16; H, 8.66. Found: C, 73.66: H, 8.22.

EXAMPLE 7

15β-hydroxyprogesterone-acetate

When 15β-hydroxyprogesterone is treated with pyridine-acetic anhydride at room temperature in accordance with the procedure of Example 6, or with acetic anhydride in sodium acetate at boiling temperature, there is formed a mixture containing some starting material and the amorphous 15β-hydroxyprogesterone acetate.

EXAMPLE 8

15α-hydroxyprogesterone enanthate

Following the procedure of Example 6, 370 mg. of 15α-hydroxyprogesterone in 3 ml. of dry pyridine and 0.15 ml. of n-heptanoic anhydride is allowed to stand at room temperature for 24 hours. The 15α-hydroxyprogesterone enanthate thus produced is recovered by the procedure of Example 6.

In a similar manner, 15β-hydroxypyrogesterone enanthate can be prepared. Furthermore, by substituting other lower alkanoic anhydrides, such as propionic anhydride, butyric anhydride, and valeric anhydride, for the acetic anhydride of Examples 6 or 7 or the heptanoic anhydride of Example 8, the corresponding propionate, butyrate, and valerate esters are prepared.

The invention may be variously otherwise embodied within the scope of the appended claims.

We claim:

1. A steroid selected from the group consisting of 15-hydroxyprogesterone and hydrocarbon carboxylic acid esters thereof, wherein the acid moiety contains less than ten carbon atoms.
2. 15α-hydroxyprogesterone.
3. 15β-hydroxyprogesterone.
4. A hydrocarbon carboxylic acid ester of 15-hydroxyprogesterone, wherein the acid moiety contains less than ten carbon atoms.
5. A lower alkanoic acid ester of 15-hydroxyprogesterone.
6. 15-hydroxyprogesterone acetate.
7. 15α-hydroxyprogesterone acetate.
8. 15β-hydroxyprogesterone acetate.
9. 15α-hydroxyprogesterone enanthate.
10. The process for preparing esters of 15-hydroxyprogesterone, which comprises reacting, in the presence of a basic agent, 15-hydroxyprogesterone with an acylating agent selected from the group consisting of a carbonyl halide of a hydrocarbon carboxylic acid containing less than ten carbon atoms and a carboxylic acid anhydride of a hydrocarbon carboxylic acid containing less than ten carbon atoms, and recovering the ester thus formed.
11. The process of claim 10 wherein the 15-hydroxyprogesterone is 15α-hydroxyprogesterone.
12. The process of claim 10 wherein the 15-hydroxyprogesterone is 15β-hydroxyprogesterone.
13. The process of claim 10 wherein the acylating agent is a lower alkanoic anhydride.
14. The process of claim 10 wherein the acylating agent is acetic anhydride.
15. The process of claim 10 wherein the acylating agent is heptanoic anhydride.

References Cited in the file of this patent

UNITED STATES PATENTS

| | | |
|---|---|---|
| 2,602,769 | Murray | July 8, 1952 |
| 2,709,705 | Perlman | May 31, 1955 |

OTHER REFERENCES

Titus et al.: J. Am. Chem. Soc., 74, 2126 (1952).